Patented Dec. 15, 1925.

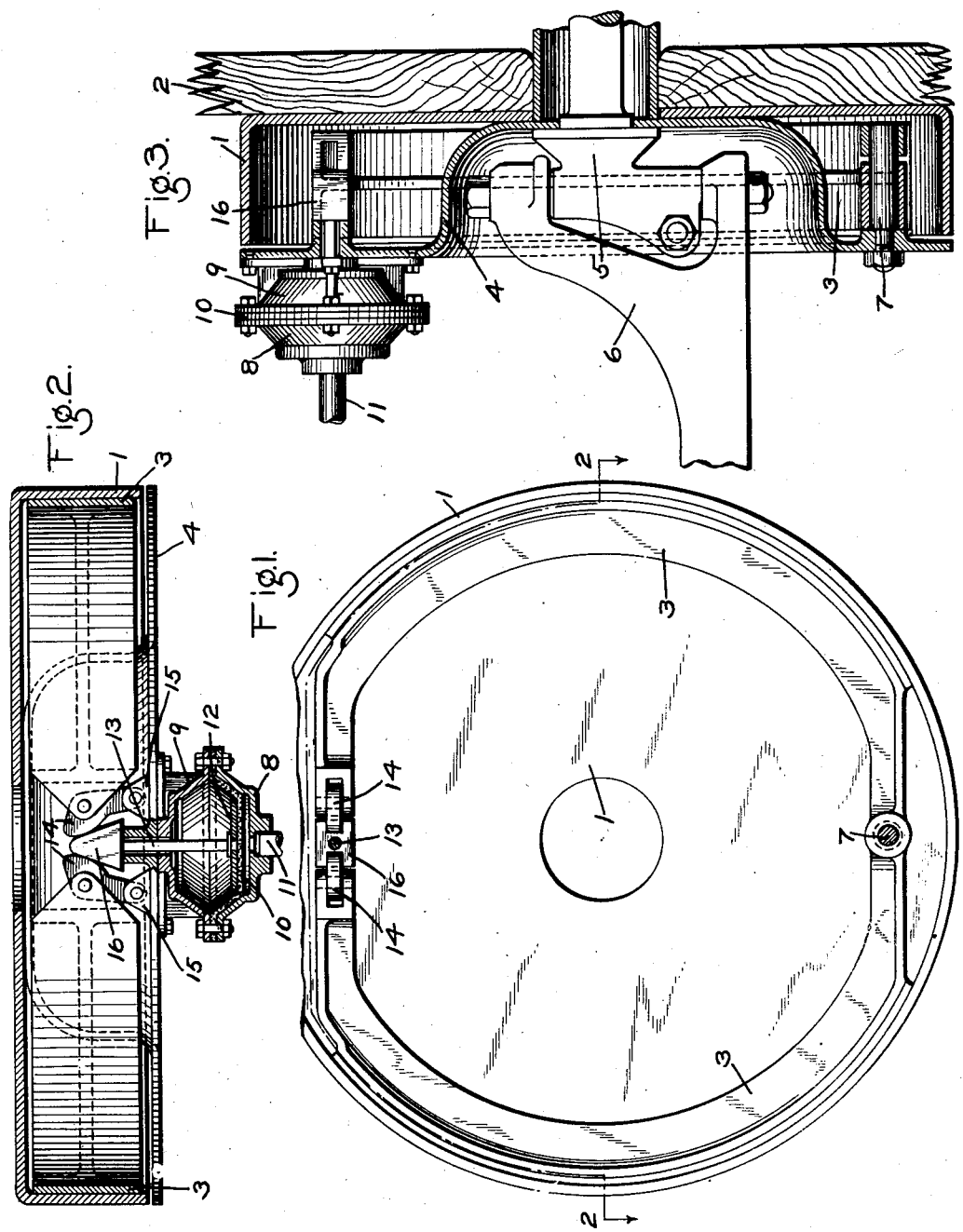

1,565,492

UNITED STATES PATENT OFFICE.

CLYDE A. OHL, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE DEVICE.

Application filed January 11, 1924. Serial No. 685,561.

*To all whom it may concern:*

Be it known that I, CLYDE A. OHL, a citizen of the United States, residing at Wilkinsburg, in the county of Allegheny and State of Pennsylvania, have invented new and useful Improvements in Automotive Brake Devices, of which the following is a specification.

This invention relates to brakes, and more particularly to a fluid pressure brake construction adapted for the front wheels of a motor vehicle.

In the accompanying drawing; Fig. 1 is an inside face view of a brake drum, with my improved brake mechanism applied thereto, but omitting the brake chamber; Fig. 2 a section on the line 2—2 of Fig. 1; and Fig. 3 a vertical section of the construction shown in Figs. 1 and 2 and shown applied to the front wheel of a motor vehicle.

As shown in the drawing, a brake drum 1 having an internal friction face is secured to the front wheel 2 of a motor vehicle. Mounted in said drum are pivotally connected braking members 3, having friction faces adapted to engage the internal friction face of the brake drum 1.

A cover plate 4 closes the open end of the brake drum and is secured to the usual knuckle 5, which supports the front wheel, the plate 4 having a central depression for receiving the knuckle 5 and the end portion of the front axle 6. The brake members 3 are supported by the plate 4 through pivot pin 7 and secured to the cover plate is a diaphragm brake chamber comprising flanged casing members 8 and 9 having an interposed flexible diaphragm 10, secured between the flanges of the casing members.

A pipe 11 leads through casing member 8 to the chamber at one side of the diaphragm 10 and a pressure plate 12 engages the opposite side of said diaphragm. Secured to said pressure plate is a rod 13 which extends out of the brake chamber through a central opening in the casing member 9.

Pivotally connected to each of the adjacent free ends of the breaking members 3 is a lever 14, each having one end pivotally connected to a lug 15 carried by each brake member.

The diaphragm rod 13 is provided at its outer end with a wedge block 16 adapted to engage the adjacent faces of the levers 14.

When it is desired to effect an application of the brakes, fluid under pressure is supplied through pipe 11 to the flexible diaphragm 10, and the diaphragm is thereby forced outwardly so that the rod 13 operates the wedge block 16 to spread the levers 14 and thus the brake members 3 are forced into frictional engagement with the brake drum 1. The connection of the levers 14 to the lugs 15 prevents the brake members 3 from being forced laterally by the operation of the wedge block 16.

Having now described my invention, what I claim as new and desire to secure by Letters Patent, is:—

In a vehicle brake, the combination with a brake drum and braking members mounted in said drum, of a cover plate for said drum, a brake chamber carried by said cover plate, a wedge for spreading said braking members, a movable abutment in said brake chamber for operating said wedge, and members interposed between said wedge and said braking members and connected to said cover plate for preventing lateral movement of said braking members.

In testimony whereof I have hereunto set my hand.

CLYDE A. OHL.